Patented Aug. 20, 1935

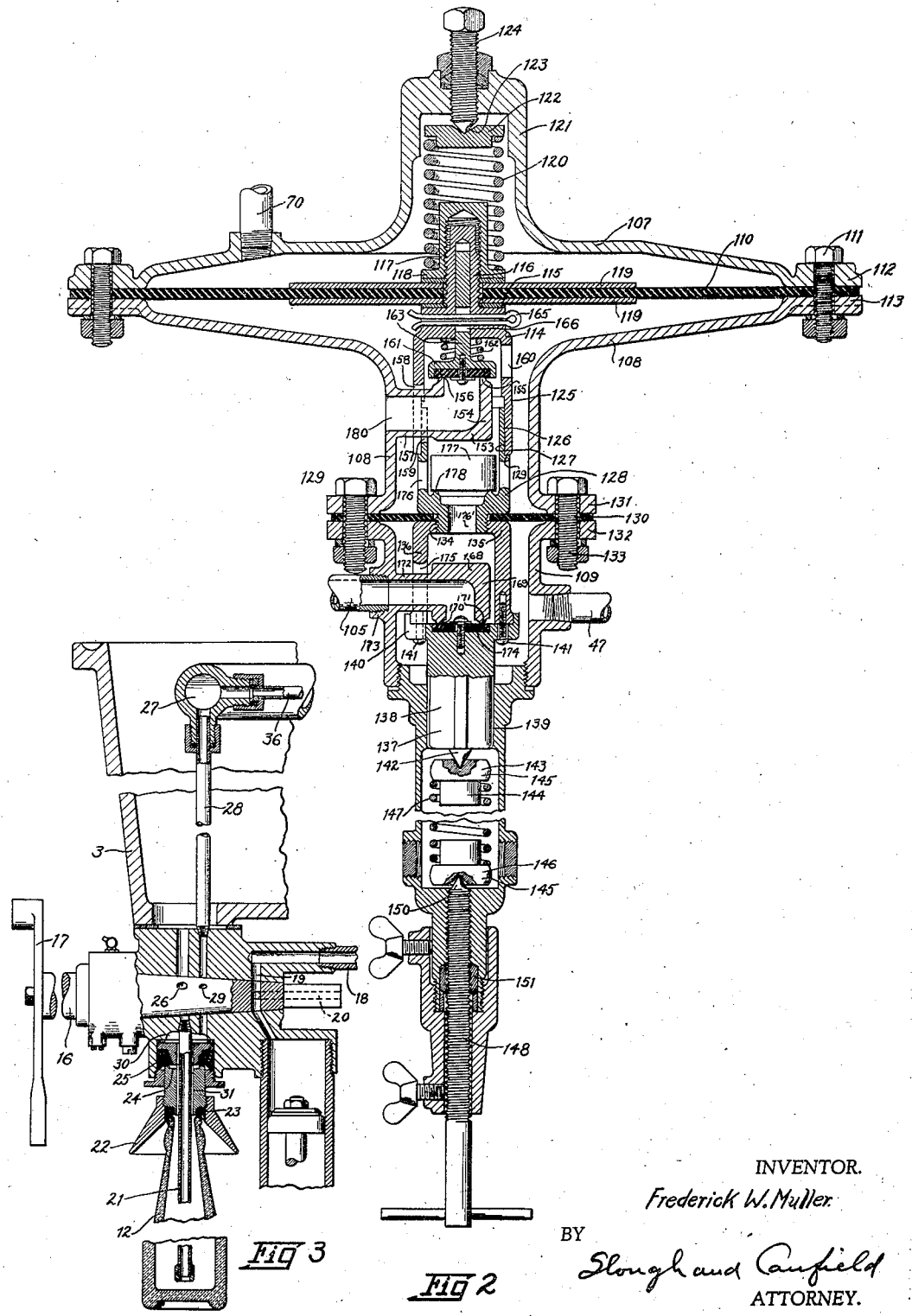

2,012,247

UNITED STATES PATENT OFFICE 2,012,247

BOTTLE FILLING MEANS

Frederick W. Muller, Hoboken, N. J., assignor to The Bishop & Babcock Manufacturing Company, Cleveland, Ohio, a corporation of Ohio Application May 25, 1933, Serial No. 672,848

22 Claims. (Cl. 226—115)

This invention relates to bottle filling machines and relates particularly to bottle filling machines of the type in which a plurality of bottles continuously fed to the machine are automatically and successively filled with a beverage such as beer, carbonated syrup or the like.

The invention comprises certain features of improvement over the mechanism illustrated in U. S. Letters Patent No. 956,285 and No. 956,286, issued to J. H. Champ, April 26, 1910, to which patents reference may be had for a fuller description of certain auxiliary parts of the bottle filling machine hereinafter described in brief and not described in detail, these parts being well known in the art and particularly described in the said prior Champ patent.

This invention also comprises certain features fully illustrated and described in the patent to F. W. Muller, No. 1,919,665, issued July 25, 1933, for improvements in Bottle filling machines and methods, and reference will be made herein to that patent for a more complete description of certain elements of apparatus and steps of process briefly referred to herein and not constituting essential parts of the present invention.

In the said Muller patent, a bottle filling apparatus and method is described by which a supply of the liquid beverage such as beer is maintained in a bottle filling tank at a predetermined substantially constant level of liquid in the tank and at a predetermined substantially constant pressure of gas in the tank above the surface of the liquid therein, the gas being that which emanates from the beer.

The tank is provided with a plurality of beer outlets controlled by automatically operated valves and a train of empty bottles is moved successively into sealed relation with the outlets and beer is admitted to the bottle interiors by the valves. A closed counter-pressure reservoir or conduit system introduces air or other gas under pressure to the interior of the bottle being filled, opposing the flow of the beverage thereinto. The beverage flows into the bottles under the joint motivation of the gas pressure above the liquid in the tank and the gravity head of the liquid, and the counter-pressure supplied to the interiors of the bottles is greater than the pressure in the tank above the liquid by a predetermined difference, leaving only a relatively small resultant motivating effect whereby the beer flows relatively slowly and gently into the bottles and agitation and loss of gas from the beverage is prevented.

The beer or like beverage is supplied to the tank continuously to replenish that withdrawn to fill the bottles from one or more relatively large reservoirs or government tanks located at a level below the filling tank and the beverage is forced therefrom and up into the tank by the application of pressure from an outside source to the beer in the government tanks. To maintain the pressure of the gas above the liquid in the filling tank substantially constant, the application of pressure to the government tanks is controlled by an automatic valve device responsive to the pressure in the filling tank.

The counter-pressure supplied to the bottle interiors is, when the bottle filling machine is first started up or upon the occurrence of an accidental leak which may be occasioned by a broken bottle, supplied from an outside source of gas under pressure; and in the normal operation of the machine, the counter-pressure gas may be the air forced out of preceding bottles of the train by the flow of the liquid thereinto. In order to maintain the said predetermined pressure difference of the bottle counter-pressure over the flow motivating tank liquid head and tank pressure, the application of outside gas pressure to the counter-pressure system to maintain the counter-pressure, and the venting of the counter-pressure system to prevent the counter-pressure from exceeding a predetermined value, is effected by automatic valve devices, the operation of which is controlled by the gas pressure above the liquid in the filling tank.

In said Muller patent, one form of automatic valve mechanism for thus controlling the counter-pressure responsive to variations or tendency to vary of the pressure in the filling tank above the liquid is clearly set forth.

It is an object of the instant invention to provide, in a bottle filling apparatus of the class referred to, an improved valve mechanism for controlling the counter-pressure applied to the bottle interiors.

Another object of the invention is to provide such an improved valve mechanism having means responsive to slight variations of the pressure in the filling tank for controlling the bottle counter-pressure.

Another object is to provide such an improved valve mechanism responsive to pressure in the filling tank for venting the bottle counter-pressure system upon a rise or tendency to rise thereof above a predetermined value and for admitting gas under pressure to the bottle counter-pressure system upon a tendency to fall or upon the occurrence of a fall thereof below a predetermined value.

Another object is to provide such a valve mechanism comprising a single valve device for maintaining substantially constant the said bottle counter-pressure.

Another object is to provide such a valve mechanism comprising a single valve device for maintaining between upper and lower adjustable limits the said bottle counter-pressure.

Another object is to provide such a valve device having improved means for adjusting the value of the bottle counter-pressure controlled thereby.

Other objects will be apparent to those skilled in the art to which my invention appertains.

My invention is fully disclosed in the following description taken in connection with the accompanying drawings, in which:

Fig. 2 is a longitudinal sectional view to an enlarged scale of a valve mechanism embodying my invention and shown to a smaller scale in Fig. 1;

Fig. 3 is a fragmentary view of a part of the machine of Fig. 1, drawn to a larger scale and illustrating in section a valve mechanism shown in elevation in that figure.

Figure 1:
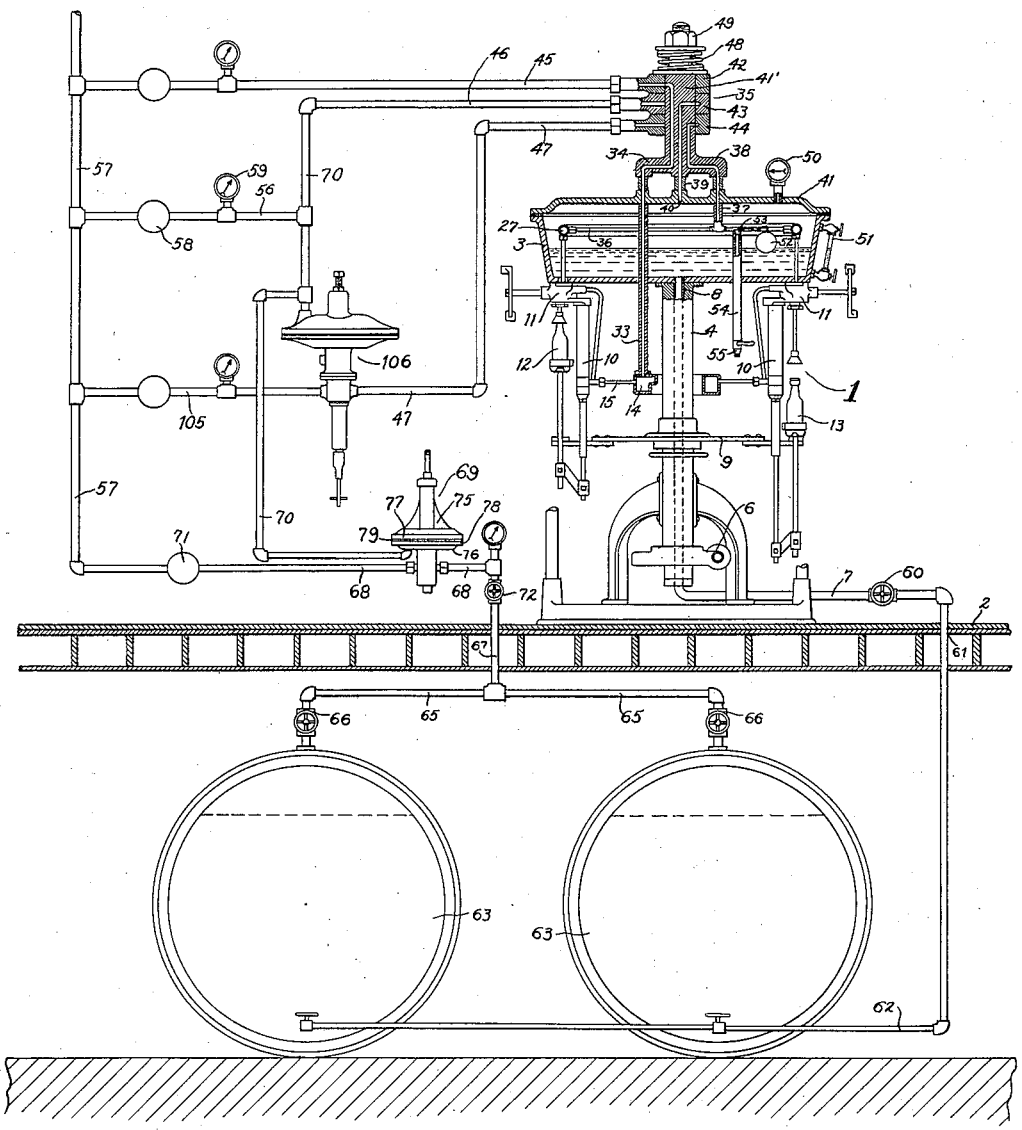
Fig. 1 is a view illustrating in some respects diagrammatically a bottle filling machine and an embodiment of my invention forming a part thereof.

Referring to the drawings, I have shown generally at 1 a bottle filling machine standing upon a floor 2, the machine comprising a beverage liquid bottle filling supply tank 3 in the upper portion thereof. The tank 3 is rotatable with and supported upon a central tubular column 4 and rotating power is supplied by a worm and gear mechanism 6.

A conduit 7 communicates with the interior of the tubular column 4, and interiorly thereof joins with a conduit 8 discharging into the tank 3 and a suitable rotary coupling (not shown) connects the conduit 7 with the conduit 8 whereby the tank 3 and conduit 8 may rotate relatively to the conduit 7.

A disc 9 rotates with the column 4 and supports a plurality of annularly disposed bottle lift devices 10—10 and bottle filling valve devices 11—11, the latter being shown separately and to a larger scale in Fig. 3. By the construction thus briefly described it will be apparent that the tank 3 and the entire superstructure including the disc 9, bottle lift devices 10 and valves 11 may all be rotated as a unit with the tubular column 4.

The operations of the machine, generally with respect to the mechanical movement transmitted to the bottles, the operation of the valve devices 11, and the filling of the bottles from liquid in the tank 3, are similar to the operations described in the aforesaid Champ patents and need not be described in complete detail here. It may suffice to say that generally the bottles, two of which are indicated at 12 and 13, are placed on the bottle lift devices 10—10, a relatively large number of which is provided. The lift devices are arranged to travel in a circular path as described above about the axis of the tubular column 4. The bottles start in their movements from a depressed position such as that illustrated for the bottle 13 wherein filling has not yet been started and are moved to an elevated position illustrated for the bottle 12 wherein filling may be accomplished.

The different bottles are progressively moved from the preliminary position 13 to the ultimate position 12 and are then filled and thence moved to a discharge position on the other side of the machine where they are again depressed from the filling position and are removed from contact with the filling valve structure 11, which will be described, and are then capped.

The form of the machine shown in the drawings is one adapted to continuously operate in connection with a continuous succession of bottles, the operations being successive, overlapping and continuous from the time the bottles are placed on the lift until they are removed therefrom after being carried in a rotative path around the machine In the following description of parts of the machine and their mode of operation more pertinent to the instant invention, reference will be had chiefly to the filling of a single bottle considering it as entering the apparatus as indicated at 12 and continuing until the bottle has been filled and removed from its supporting lift 10.

The lift devices 10 are operated by compressed air supplied, from a source and in a manner to be described, to a header 14 rotatable with the other parts of the superstructure described and connected by a conduit 15 to the lift device.

The valve device 11, shown separately in Fig. 3, comprises a rotatable valve element 16 rotatable to different successive positions by a crank 17 as the latter engages stationary abutments during the rotation of the machine superstructure, and may admit air from the header 14, the conduit 15, and branch conduit 18, (Figs. 1 and 3) through a valve port 19 either directly to the lift device 10 or to the atmosphere through a duct 20, to operate the lift device.

The operations of the lift device in connection with the valve device herein briefly referred to, and illustrated in simplified form, are described more completely in said Muller patent to which reference may be had for a more complete description.

The valve device 11, Fig. 3, has depending therefrom a filling tube 21 upon which is telescopically slidably mounted a sealing cap 22. As the bottle is moved upwardly by the lift device 10, the tube 21 enters the mouth of the bottle 12 and the bottle picks up the cap 22 and carries it upwardly into the position shown in Fig. 3 which is the final upward position of the bottle before filling it. The bottle is sealed on a sealing washer 23 in the cap 22 and the latter is itself sealed as at 24 on a packing 25 on the device.

When the bottle is thus sealed ready for filling, the valve 16 is turned another part of a revolution which simultaneously opens the port 26 in the valve, effecting communication between the interior of the tank 3 and the filling tube 21, allowing liquid in the tank 3 to flow through the tube into the bottle; and admitting air or other gas from a header 27 through a conduit 28 and through a second valve port 29 to a chamber 30 in a housing 32 of the valve device and thence through a space 31 around the tube 21 into the bottle 12.

As will be more fully described, liquid in the supply tank 3 is maintained under pressure of gas above the level of the liquid and the air or gas pressure applied to the interior of the bottle 12 from the header 27 is maintained slightly in excess of the pressure in the tank above the liquid so that the remaining force causing liquid to flow from the tank into the bottle through the tube is less, by a predetermined amount, than the hydraulic head of the liquid in the tube and tank 3.

The liquid is thus caused to flow into the bottle filling it with a slow movement which avoids agitation of the liquid and the escape of gas such as carbonating gas therefrom. As the bottle 12 fills, the air therein under the applied pressure is forced out of the bottle back up through the conduit 28 into the header 27.

After the bottle has been filled the valve 16 is again turned to shut off the ports 26 and 29 and to open the port 19 to operate the bottle lift device 10 to lower bottle, and it may be removed and capped.

The compressed air header 14 is supplied with compressed air through a conduit 33 carried through the tank 3 and communicating with a radial arm 34 on a rotary coupling device shown generally at 35, to be described. The header 27 in the tank 3 communicates by a conduit or pipe 36 with a vertical pipe 37 in the tank 3, which passes outwardly through the tank and communicates with a radially disposed arm 38 on the device 35. A third arm 39 on the device communicates with the interior of the tank 3 by a short conduit 40 at the top or cover 41 of the tank.

The rotary coupling device 35 comprises a cylindrical body 41' adapted to rotate with the tank within stationary couplings 42, 43, and 44 telescoped and sealed thereon, and each of the couplings communicating interiorly with the external stationary conduits 45, 46, 47 respectively. An internal duct in the body 41' communicates at one end with the coupling 42 and through the arm 34 with the conduit 33; and an internal duct communicates with the coupling 43 and the duct 40; and an internal duct communicates with the coupling 44 through the arm 38 with the conduit 37.

Thus open communication is at all times maintained between the conduits 45, 46 and 47, and the conduit 33 supplying compressed air to the head 14, and the conduit 40 communicating with the tank 3 and the conduit 37 supplying air or gas under pressure to the head 27 respectively; and during rotation of the tank and its superstructure as described relative to the conduits 45, 46, and 47.

The couplings 42, 43, and 44 may be sealed on the cylindrical body 41 in any suitable manner as for example by pressing the couplings together by a compression spring 48 under a nut 49 on the body. This construction may be variously modified and does not constitute an essential part of my present invention.

The foregoing description applies particularly to the bottle filling machine proper and there will now be described means for continuously supplying liquid to the tank 3 to replace that which flows into the bottles and for maintaining the liquid in the tank 3 at substantially a constant level and at a predetermined pressure of gas above the liquid surface in the tank; and for establishing the liquid level and tank pressure upon starting up the machine.

The tank 3 at a point well above the desired level of liquid and preferably in the cover 41 thereof is provided with a pressure gauge 50. Laterally of the tank 3 a liquid level indicating gauge 51 of the conventional glass tube type is provided communicating with the interior of the tank above and below the desired level. Within the tank a float valve is provided comprising a float 52 in the liquid, adapted, upon rising with a rise of liquid level, to close a valve port at 53 in the upper end of a pipe 54 which pipe extends downwardly through the bottom of the tank, and below the tank is provided with a vent valve 55 manually operable.

The conduit 46 which communicates with the interior of the tank through the conduit 40 as described, connects by a conduit 56 with a conduit 57 which is connected to a source of gas pressure supply. The pressure supply may be a supply of compressed air provided by a pump or other means; or it may be a supply of other gas under pressure, such for example as carbon-dioxide. The conduit 56 may be manually controlled by a valve 58 and a supplemental gauge 59 may be provided in the line of the conduit 56 if desired.

The conduit 7 above described has in the line thereof a manually operable valve 60. The conduit 7 continues along the floor 2, downwardly therethrough as at 61, to a basement or lower floor of the building in which the machine is installed and connects to a conduit 62 which communicates with the interior of a plurality such as two large capacity reservoirs or tanks, commonly known in this art as government tanks, 63—63. The communication with the tanks 63 is effected preferably at a point relatively low in the reservoir but not at the bottom thereof whereby dregs may accumulate on the bottom of the tank without being discharged out through the conduit 62.

At an upper portion of each reservoir 63, a conduit 65 is connected, communicating with the interior of the tank through a manually operable valve 66; and connected with the conduit 65 is a conduit 67 passing upwardly through the floor 2 and joining a conduit 68, which is connected to the conduit 57.

In the line of the conduit 68 is connected a compensator valve device, indicated generally at 69. Communicating with the device 69 is also a counter pressure conduit 70 joining the conduit 46 and thus communicating with the interior of the tank 3 at 40. The compensator valve device 69 will be more fully described later.

The reservoir or government tanks 63—63 are filled, or substantially filled, with beer or liquid to be bottled, and when the liquid has all been discharged therefrom and bottled in a manner to be described, these tanks are disconnected from the system and cleaned out to remove the dregs from the bottom thereof and are then re-filled from a manufactured supply. A cycle of operations for the bottle filling machine is thus established determined by the joint capacity of the tanks 63. At the end of this cycle, the bottling machine must either be shut down or the conduits 7 and 67 must be disconnected and connected to another set of tanks 63 to start a new cycle. The duration of the cycle may be extended by the use of a greater number than two tanks, as will be obvious.

At the beginning of each cycle it is necessary or desirable to establish initially or reestablish the liquid level and pressure in the tank 3, and this operation will now be described in connection with the apparatus above referred to.

The rotation of the tank 3 is stopped and all of the valves 16 are turned to the off position manually. The valve 60 in the conduit line 7 is closed and the pressure supplied to the tank 63 is closed, either by a valve 71 or a valve 72 in the conduit line 68.

After the tanks 63 have been cleaned out and refilled or connections have been made to a supplemental set of tanks, the valve 58 in the conduit line 56 is opened admitting the pressure of a supply of air or gas therethrough to the conduit 70 whereby the pressure is communicated to the conduit 46 and the conduit 40 to the interior of the tank 3. The pressure in the tank is thus permitted to increase until it indicates a predetermined pressure such as five pounds on the gauge 50. The valve 58 may then be closed. The valve 71 or 72, or both, are then opened to admit the supply pressure to the tanks 63 above the liquid therein. The valve 60 is then slowly opened and beer is forced out of the tank 63 upwardly through the conduits 7 and 8 into the tank 3.

It is assumed that at this time the level of the liquid in the tank 3 is below the normal predetermined desired level and therefore the float 52 is in a lowered position which holds open the valve port 53. As the liquid flows into the tank 3 its rising level is indicated on the gauge 51. To insure that it will rise to the correct level, the vent 55 is partly opened manually to allow some of the gas in the tank to escape and to be replaced by liquid. When a desired level has been reached, the float 52 closes the valve port 53 and then the vent 55 is opened its full amount for subsequent release purposes. Venting at the vent 55 ceases when liquid has reached its correct level. The rising level of liquid in the tank 3 tends to increase the pressure above its surface as indicated on the gauge 50. Until the predetermined level is reached, the gas above the liquid may escape through the vent 55 so that regardless of the pressure above the liquid, the liquid will continue to rise to the predetermined level. But in all cases and at all times, the pressure in the tank above the liquid is prevented from rising from the predetermined value such as five pounds regardless of the value of the pressure externally applied to the reservoirs 63, by the compensator valve device which will now be described.

Upon establishing the predetermined level in the tank and at the predetermined pressure, the machine may be revolved and the bottling process resumed. As the liquid rises in the tank 3, the air which was introduced thereinto is displaced by gas emanating from the beer, carbonated beverage or like liquid supplied to the tank. Thus the space in the tank above the liquid is cut off from contact with contaminating air, when the source of pressure supply is compressed air.

The compensator valve device 69 may be variously constructed and the exact construction thereof does not form an essential part of the present invention. One form of such valve device is shown and described in detail in the above mentioned Muller patent.

In general, it comprises an upper housing 75 and a lower housing 76 and a circular diaphragm 79 clamped between flanges 77 and 78 on the housings. A valve, not shown, is disposed in the line of the conduit 68 and in the housing 76 adapted to move to open and close the conduit line; and adapted to be moved, by movement of the diaphragm 79, which moves responsive to changes of pressure in the conduit 70, the conduit communicating with the interior of the housings.

In general, the device is so arranged that upon an increase of pressure in the conduit 70 occurring upon an increase of pressure in the tank above the liquid, the diaphragm 79 is moved to move the said valve to reduce the flow through the conduit line 68, or shut it off entirely; and vice versa. For a more complete description of the operation of the valve device 69, reference may be had to the said Muller patent.

When the pressure in the tank 3 above the liquid, transmitted from the tank through the conduit 46, and conduit 70, exceeds a predetermined pressure such as five pounds, the valve device 69 cuts off the supply of pressure from the conduit 57 to the tanks 63—63, and stops further supply of liquid to the tank 3. If the pressure in the tank 3 correspondingly should fall the device will operate to admit pressure to the tanks 63, and admit more liquid to the tank 3, which in turn tends to compress the gas above the liquid and raise the pressure thereof to correspondingly prevent the admission of more liquid when the predetermined desired level and pressure in the tank has been reached.

The drawing of liquid from the tank 3 to fill the bottles in the operation of the machine tends to reduce the pressure above the liquid in the tank and this, by means of the compensator valve described, effects the application of pressure to the reservoirs 63-63 to elevate more liquid into the tank 3 and restore the pressure therein. In practice the regulation is accomplished continuously so that the level in the tank and the pressure thereabove are maintained substantially constant.

If, due to any extraneous cause, pressure in the tank 3 above the liquid should increase in spite of the fact that outside pressure was cut off from the reservoirs 63 by the compensator valve, the liquid would tend to fall slightly, and, through the action of the float 52, would open the valve port 53 and vent some of the pressure through the vent valve 55 to restore the predetermined pressure. If, similarly, due to any extraneous cause, the pressure in the tank above the liquid should decrease, the compensator valve would effect application of pressure to the reservoirs 63-63 to restore the pressure in the tank 3 but at a higher level than the desired level. This could be counter-acted by admitting gas under pressure into the conduits 56—70 by momentarily opening the valve 58 to restore the liquid to its former predetermined level and then again shutting off the valve 58 after which the apparatus will operate as described to maintain the level and pressure in the tank 3.

The change of pressure in the tank 3 by the referred to extraneous causes does not occur in the ordinary operation of the apparatus and when once the system is put into operation, it will operate over long periods of time maintaining the pressure and level in the tank 3 substantially constant. They are only mentioned here to show that the apparatus and systems are operable to correct abnormal conditions which might arise.

The elements of the system and apparatus for applying counter-pressure to the interiors of the bottles will now be described. A regulator valve device, shown generally at 106 in Fig. 1 and illustrated separately to a larger scale in Fig. 2, is connected to the conduits 79 and 47, and to a conduit 105 communicating with the pressure supply of air or other gas 57 in connection with the following construction.

The regulator valve device 106 comprises an upper housing portion 107, an intermediate housing portion 108, and a lower housing portion 109. A diaphragm 110 is clamped by bolts 111 between peripheral flanges 112 and 113 on the housing portions 107 and 108. The conduit 70 communicates with the interior of the housing portion 107 above the diaphragm 110.

A head 114 is rigidly secured to a central portion of the diaphragm 110 by means of a shoulder portion 115 on the head, a stem 116 extending upwardly from the head and through a central perforation in the diaphragm 110 and a nut 117 threaded on the stem, the nut having a flange 118, and the diaphragm being clamped between the flange and the shoulder portion 115 by screwing the nut 117 on the stem 116.

If desired, plates 119—119 may be provided on each side of the diaphragm under the flange 118 and above the shoulder portion 115.

A compression spring 120 in an upwardly extending tubular portion 121 of the housing portion 107 presses downwardly on the diaphragm 110, one end of the spring abutting upon the flange 118 and other end abutting upon a cap element 122 having a central recess 123 into which the end of an adjusting screw 124 is lodged, the screw being threaded into the closed upper end of the tubular portion 121.

By this means upon turning the screw 124 the tension of the spring 120 may be adjusted, as will be understood.

The head 114 below the diaphragm 110 extends downwardly in parti-tubular form, as at 125, the inner parti-cylindrical surface 126 thereof being telescoped over the corresponding parti-cylindrical outer surface 127 of a parti-tubular reciprocatory head 128. The lower end of the tubular portion 125 of the head 114 abuts upon a shoulder 129 on the head 128, when the diaphragm 110 is in a lower position, to be described.

The head 128 comprises two parts secured to a diaphragm 130 clamped between flanges 131 and 132 on the housing portions 108 and 109 by bolts 133. One part of the said head being the part 128, above referred to, which is provided with a downwardly extending threaded stem 134 which projects through a central perforation in the diaphragm 130, and the other part 135 having a central perforation threaded on the stem 134 and projecting downwardly therefrom in the parti-tubular portion 136. The diaphragm 130 is clamped between opposite shoulder portions on the parts 128 and 135 of the reciprocatory head.

The part 136 of the reciprocatory head has secured to the lower end thereof, a guide 137 comprising an axially elongated body portion 138, guided for vertical reciprocatory movement in a bore 139 of the lower housing portion 109, and having on its upper end a generally cup-form flange 140 embracing the lower end of the head part 136, and secured thereto by screws 141 projected through perforations in the cup-form portion and threaded into the head part 136.

The guide 138 terminates downwardly in an axially disposed pointed portion 142 engaging a recess in an upper spring guide 143, having the neck portion 144 and a flange 145. A similar spring head 146 is disposed axially spaced from the spring head 143 and upsidedown relative thereto. A compression spring 147 is disposed between the two spring heads and abutting upon the flanges 145—145 thereof.

An adjusting screw 148 threaded axially in the lower end of the lower housing portion 109 has on its upper end a point 150 entering the recess of the spring head 145.

The screw 148 is sealed in the housing by a suitable packing 151.

The spring 147 exerts an upward resilient thrust on the guide 138 for a purpose to be described, and by turning the screw 148, the tension of the spring may be adjusted.

Substantially enclosed by the downwardly extending tubular portion 125 of the head 114 is a valve construction comprising an L-shaped tubular conduit 153 having a vertical leg 154 upwardly open and terminating in an annular valve seat 155 surrounding a valve port 156 and a horizontal leg 157 joined to the housing portion 108 and providing a passageway from the port 156 through the vertical and horizontal legs 154 and 157 to the exterior of the housing portion 108.

The above described parti-tubular portion 125 of the head 114 and the parti-tubular part 128 are provided with longitudinally or axially extending notches or forks respectively 158 and 159, which straddle the horizontal leg 157 of the conduit 153.

The tubular portion 125 of the head 114 is furthermore provided with a plurality of wall perforations 160 by which free communication is established between the interior and the exterior of the tubular portion 125.

Upon the valve seat 155 is a valve element 161 sealingly engaging the same, and normally spring pressed thereupon by a spring 162 surrounding a valve stem 163 and abutting at one end upon the valve 161 and at the other upon an inner shoulder on the head 114.

The valve stem 163 extends axially upwardly through the head 114 and into the threaded stem 116 and is slidable axially therein.

A cotter pin 165 is projected transversely through the head 114 and through an axially elongated perforation or slot in the valve stem 163.

By the construction just described, upon upward movement of the diaphragm 110, occasioned in the operation of the regulated device to be more fully described, the head 114 is moved upwardly thereby, the tubular portion 125 sliding telescopically on the tubular portion of the head 128, and the cotter pin 165 moving upwardly in the slot 166 in the valve stem 163. After a predetermined small movement, the cotter pin will pick up the valve stem and lift the valve 163 from the valve seat 155, opening the valve port 156 and establishing communication between the space interiorly of the housing portion 108, and/or the interior of the head 114 to the atmosphere through the conduit 153.

Upon downward movement of the diaphragm 110 the valve element 161 is resiliently seated upon the valve seat 155 and the legs of the slot 166 in the stem 163 permit downward movement of the diaphragm beyond the valve seating position. Thus the diaphragm has a limited movement upwardly and downwardly without disturbing the seal of the valve element 161 on the valve seat 155.

Within the tubular portion 136 of the head 128, or of the part 135 thereof below the diaphragm 130 is another valve device comprising an L-shaped conduit 168 having a vertical leg 169 terminating in a downwardly open valve port 170 surrounded by an annular valve seat 171, the horizontal leg 172 of the conduit communicating with the exterior of the housing portion 109 in an interiorly threaded boss 173 into which the conduit 105, hereinbefore referred to, is threaded and sealed. An upper portion of the body 138 of the guide 137 is provided with a sealing washer 174 adapted to seal the valve seat 171 when in an upper position.

The parti-tubular portion 136 is provided with a longitudinal or axially extending notch or slot 175 straddling the leg 172 of the conduit 168, and the interior of the part 135 of the head 128 communicates with the space above the diaphragm 130, through a passageway 176' extending axially through the threaded stem 134 and into the interior of the head 128, and a plurality of perforations 176 in the wall of the head 128 effect communication between the interior and the exterior thereof. A cylindrical weight 177 rests upon an annular bead 178 at the upper mouth of the passageway 176' and acts in the general nature of a valve for a purpose to be described.

The conduit 47 communicates with the interior of the housing portion 109 and hence with the interior of the part 135 and by way of the passageway 176 with the interior of the housing portion 108.

By means of the parts thus far described, if the diaphragm 110 is moved downwardly the tubular portion 125 of the head 114 will, by abutting upon the shoulder 129, force the head 128 comprising the part 135 downwardly, bending the diaphragm 130, and force the valve seat 174 away from the valve port 171 against the tension of the spring 147 and permit the entrance of air or other gas to the conduit 105, through the valve port 171 and into the part 135 and/or the housing portion 109.

Upon upward movement of the diaphragm 110, the spring 147 will elevate the valve element 174 to close the valve port 171 and further upward movement will be stopped by the stationary valve seat 170.

The conduit 70 is connected to the housing portion 107 to communicate with the interior thereof above the diaphragm 110.

In the operation of the regulator device, in connection with the apparatus of Fig. 1, it will be observed that at all times the upper side of the diaphragm 110 is subjected to the pressure of the gas above the level of liquid in the filling tank by means of the conduit 70, tending to move the diaphragm downwardly. The spring 120 assists this gas pressure. At the time of starting up the apparatus there is no opposing pressure on the lower side of the diaphragm 110, and therefore the diaphragm assumes its lowermost position, closing the valve port 156 and opening the valve port 171.

Air or other gas under pressure from the conduit 57 is then admitted to the conduit 105 and it flows through the valve port 171 upwardly through the passageway 176', lifting the weight 177, and flowing into the housing 108 to the lower side of the diaphragm 110; and flowing also into the housing portion 109 and thence through the conduit 47 to the header 27 for application to bottle interiors, as described above.

The incoming gas or air causes an accumulation of pressure in the counter-pressure system just referred to and reaches a value sufficient to raise the diaphragm 110 closing the valve port 171 and shutting off further increase of counter-pressure. Inasmuch as the counter-pressure on the diaphragm must oppose both the tank gas pressure in the conduit 70 and the spring 120, it may continue to increase until it is in excess over the gas pressure above the diaphragm 110 by the predetermined amount necessary to compress the spring 120. In this way the counter-pressure is always greater than the tank gas pressure by a predetermined amount, which can be varied by adjusting the tension of the spring 120.

In the operation of the bottle filling machine above described, when the liquid flowing into the bottles forces the counter-pressure gas out of the bottle, the air in the counter-pressure system discharged thereinto from a succession of bottles, accumulates and causes the counter-pressure to increase. This as will now be understood causes the diaphragm 110 to be gradually moved upwardly and ultimately to open the valve port 156 whereupon counter-pressure or bottle air is vented through the valve port to the atmosphere to lower or restore the counter-pressure to its desired predetermined value.

Normally the bottle filling machine may operate over substantial periods of time without the admission of additional counter-pressure air through the valve port 171 and may continuously or intermittently discharge excess bottle air through the valve port 156 to the atmosphere.

Should the tank pressure above the liquid therein increase due to any extraneous cause, it will lower the diaphragm 110 from its normal position and admit more air to the counter-pressure system to maintain the predetermined pressure difference. Similarly, should the tank gas pressure decrease due to any extraneous cause, the diaphragm 110 will be raised by the excess counter-pressure and vent a part thereof to establish the predetermined pressure difference.

The spring 147 may be adjusted to counterbalance the weight of the parts and to prevent opening of the valve port 171 by pressure supplied through the conduit 105.

Furthermore, adjusting the spring 120 alone will adjust the venting counter-pressure and adjusting the spring 147 alone will adjust the value of counter-pressure at which more gas or air is admitted to the system. Adjusting either or both springs in the direction to assist the counter-pressure in moving the diaphragm 110 upwardly, will reduce the predetermined pressure difference between the tank gas pressure and the bottle counter-pressure and therefore will cause the bottles to fill at a higher level, and vice versa at a lower level whereby the level in the bottle may be adjusted.

By providing the weight 177 to resist the flow of gas or air through the passageway 176, surges thereof are prevented and the operation is at all times rendered smooth.

By employing the diaphragm 130, the flow of air is forced to occur through the passageway 176.

As will now be understood from the foregoing description, in the operation of the machine as a whole, the interior of a bottle such as the bottle 12 is first subjected to the pressure of the air or other gas in the header 27 and then, as the liquid flows from the tank 3 into the bottle, the gaseous contents of the bottle are forced out and back into the header 27. Thus there is a tendency for pressure to accumulate in the conduit system 27—47 and a tendency for the bottle pressure to exceed the head of the liquid and the pressure thereabove by more than a predetermined difference. This will tend to close the valve port 171 in the regulator device 106 and then to stop the supply of pressure through the conduit 105 from the outside source. To prevent the accumulation of pressure occasioned by adding the bottle air to the system, it may vent to the atmosphere from the device 106 through the valve port 156 through the vent 180. On the other hand, to maintain the bottle pressure to prevent its falling below the predetermined difference, the regulator 106 may admit pressure from the outside source.

Both the regulator 106 and the compensator device 69 are controlled in their operation by pressure from the tank 3 in the conduit 70 to maintain the said predetermined difference or excess of pressure in the bottle over that of the head of liquid and pressure in the tank 3.

From the foregoing it will be observed that the entire system supplying pressure to the bottle interiors is maintained distinct and isolated from the gas above the level of the beer or other beverage in the tank 3 so that the more or less foul and/or unsterile air from the bottles cannot contaminate the beer or beverage in the filler tank by contact with it. It will also be observed in the foregoing description that the beer flows from the supply into the bottles at a relatively slow rate and therefore with the minimum of agitation and loss of gas from the beverage. The low velocity of flow into the bottles is, as will now be clear from the foregoing description, effected by maintaining a bottle pressure greater than the pressure in the tank 3 by a predetermined difference whereby a part of the head of the liquid which causes it to flow into the bottle is counter-balanced by the bottle pressure and therefore the liquid flows into the bottle under a relatively small hydraulic head. The rate of flow is maintained constant, first by maintaining a level of liquid and pressure in the tank 3 substantially constant by the compensator above described and by regulating the bottle pressure by the regulating device 106 responsive to the tank pressure. It will furthermore be observed that by making slight adjustments of the said difference of pressure between the counter-pressure and the tank pressure, the bottle may be caused to be filled to an exact predetermined level and no farther, at which level the counter-pressure exactly balances the pressure of the gas above the liquid in the tank plus the pressure of the hydraulic head of the tank liquid flowing into the bottle.

My invention is not limited to the exact method illustrated and described herein nor to the exact details of construction whereby the method may be practiced inasmuch as many modifications and changes may be made within the scope and spirit of my invention without sacrificing its advantages.

I claim:

1. In a bottle filling apparatus, a liquid supply tank containing liquid under pressure of gas in the tank above the liquid surface, conduit means for conducting liquid from the tank to a bottle to be filled, a counter-pressure gas container containing gas under pressure greater by a predetermined difference than the tank gas pressure, conduit means for conducting counter-pressure gas to the bottle interior to oppose the flow of liquid thereinto under the motivation of gas tank pressure and head of liquid in the tank, and means for maintaining the said pressure difference substantially constant comprising a supply source of gas under pressure, conduit means for conducting gas from the source to the counter-pressure container, and a single automatic means responsive to changes of tank gas pressure for controlling admission of gas to the container and discharge of gas therefrom.

2. In a bottle filling apparatus, a liquid supply tank containing liquid under pressure of gas in the tank above the liquid surface, conduit means for conducting liquid from the tank to a bottle to be filled, a counter-pressure gas container containing gas under pressure greater by a predetermined difference than the tank gas pressure, conduit means for conducting counter-pressure gas to the bottle interior to oppose the flow of liquid thereinto under the motivation of gas tank pressure and head of liquid in the tank, and means for maintaining the said pressure difference substantially constant comprising a supply source of gas under pressure, conduit means for conducting gas from the source to the counter-pressure container, and a single automatic means responsive to changes of tank gas pressure for controlling admission of gas to the container and discharge of gas therefrom upon an increase or decrease respectively of tank gas pressure.

3. In a bottle filling apparatus, a liquid supply tank containing liquid under pressure of gas in the tank above the liquid surface, conduit means for conducting liquid from the tank to a bottle to be filled, a counter-pressure gas container containing gas under pressure greater by a predetermined difference than the tank gas pressure, conduit means for conducting counter-pressure gas to the bottle interior to oppose the flow of liquid thereinto under the motivation of gas tank pressure and head of liquid in the tank, and means for maintaining the said pressure difference substantially constant comprising a supply source of gas under pressure, conduit means for conducting gas from the source to the counter-pressure container, and a single automatic means responsive to changes of counter-pressure for controlling admission of gas to the container and discharge of gas therefrom respectively upon a decrease or increase of counter-pressure.

4. In a bottle filling apparatus, a liquid supply tank containing liquid under pressure of gas in the tank above the liquid surface, conduit means for conducting liquid from the tank to a bottle to be filled, a counter-pressure gas container containing gas under pressure greater by a predetermined difference than the tank gas pressure, conduit means for conducting counter-pressure gas to the bottle interior to oppose the flow of liquid thereinto under the motivation of gas tank pressure and head of liquid in the tank, and means for maintaining the said pressure difference substantially constant comprising a supply source of gas under pressure, conduit means for conducting gas from the source to the counter-pressure container, and a single automatic means responsive to changes of tank gas pressure and pressure in the container for controlling admission of gas to the container and discharge of gas therefrom respectively upon the occurrence of a decrease of the said predetermined pressure difference or an increase thereof.

5. In a bottle filling apparatus, a liquid supply tank containing liquid under pressure of gas in the tank above the liquid surface, conduit means for conducting liquid from the tank to a bottle to be filled, a counter-pressure gas container containing gas under pressure greater by a predetermined difference than the tank gas pressure, conduit means for conducting counter-pressure gas to the bottle interior to oppose the flow of liquid thereinto under the motivation of gas tank pressure and head of liquid in the tank, and means for maintaining the said pressure difference substantially constant comprising a supply source of gas under pressure, conduit means for conducting gas from the source to the counter-pressure container, and a single automatic means responsive to changes of tank gas pressure for controlling admission of gas to the container and discharge of gas therefrom respectively upon a decrease or increase of the said predetermined pressure difference.

6. In a bottle filling apparatus, a liquid supply tank containing liquid under pressure of gas in the tank above the liquid surface, conduit means for conducting liquid from the tank to a bottle to be filled, a counter-pressure gas container containing gas under pressure greater by a predetermined difference than the tank gas pressure, conduit means for conducting counter-pressure gas to the bottle interior to oppose the flow of liquid thereinto under the motivation of gas tank pressure and head of liquid in the tank, and means for maintaining the said pressure difference substantially constant comprising a supply source of gas under pressure, conduit means for conducting gas from the source to the counter-pressure container, and a single automatic valve means comprising a valve controlling flow of counter-pressure gas to the container and a valve controlling a vent from the container and a pressure-responsive movable element for operating the valves subjected to pressure of the tank gas above the liquid.

7. In a bottle filling apparatus, a liquid supply tank containing liquid under pressure of gas in the tank above the liquid surface, conduit means for conducting liquid from the tank to a bottle to be filled, a counter-pressure gas container containing gas under pressure greater by a predetermined difference than the tank gas pressure, conduit means for conducting counter-pressure gas to the bottle interior to oppose the flow of liquid thereinto under the motivation of gas tank pressure and head of liquid in the tank, and means for maintaining the said pressure difference substantially constant comprising a supply source of gas under pressure, conduit means for conducting gas from the source to the counter-pressure container, and a single automatic valve means comprising a valve controlling flow of counter-pressure gas to the container and a valve controlling a vent from the container and a pressure-responsive movable element for operating the valves subjected to the pressure of counter-pressure gas in the container.

8. In a bottle filling apparatus, a liquid supply tank containing liquid under pressure of gas in the tank above the liquid surface, conduit means for conducting liquid from the tank to a bottle to be filled, a counter-pressure gas container containing gas under pressure greater by a predetermined difference than the tank gas pressure, conduit means for conducting counter-pressure gas to the bottle interior to oppose the flow of liquid thereinto under the motivation of gas tank pressure and head of liquid in the tank, and means for maintaining the said pressure difference substantially constant comprising a supply source of gas under pressure, conduit means for conducting gas from the source to the counter-pressure container, and a single automatic valve means comprising a valve controlling flow of counter-pressure gas to the container and a valve controlling a vent from the container and a pressure-responsive movable element for operating the valves subjected to pressure of gas above the liquid and to the pressure of counter-pressure gas in the container.

9. In a bottle filling apparatus, a liquid supply tank containing liquid under pressure of gas in the tank above the liquid surface, conduit means for conducting liquid from the tank to a bottle to be filled, a counter-pressure gas container containing gas under pressure greater by a predetermined difference than the tank gas pressure, conduit means for conducting counter-pressure gas to the bottle interior to oppose the flow of liquid thereinto under the motivation of gas tank pressure and head of liquid in the tank, and means for maintaining the said pressure difference substantially constant comprising a supply source of gas under pressure, conduit means for conducting gas from the source to the counter-pressure container, and a single automatic means for controlling admission of gas to the container and discharge of gas therefrom comprising a chamber having a movable dividing wall the opposite sides thereof being subjected to the tank gas pressure and counter-pressure respectively, and the wall being movable responsive to a predetermined difference of pressure occasioned by a variation of one or both said pressures, and valves controlling the admission of counter-pressure gas to the container and the venting of gas from the container correspondingly operable by movement of the movable wall.

10. In a bottle filling apparatus, a liquid supply tank containing liquid under pressure of gas in the tank above the liquid surface, conduit means for conducting liquid from the tank to a bottle to be filled, a counter-pressure gas container containing gas under pressure greater by a predetermined difference than the tank gas pressure, conduit means for conducting counter-pressure gas to the bottle interior to oppose the flow of liquid thereinto under the motivation of gas tank pressure and head of liquid in the tank, and a single automatic means for maintaining the said predetermined difference of pressure substantially constant comprising a walled chamber, a movable wall dividing the chamber, a conduit communicating gas tank pressure to one side of the movable wall and a conduit communicating counter-pressure from the container to the other side, a spring tending to move the wall assisting the gas tank pressure, a valve for venting the chamber on the counter-pressure side of the wall operable by movement of the wall upon a preponderance of counter-pressure in the chamber, and a valve admitting counter-pressure thereto operable by movement of the wall upon a preponderance of gas tank pressure.

11. In a bottle filling apparatus, a liquid supply tank containing liquid under pressure of gas in the tank above the liquid surface, conduit means for conducting liquid from the tank to a bottle to be filled, a counter-pressure gas container containing gas under pressure greater by a predetermined difference than the tank gas pressure, conduit means for conducting counter-pressure gas to the bottle interior to oppose the flow of liquid thereinto under the motivation of gas tank pressure and head of liquid in the tank, and a single automatic means responsive to increase or decrease of tank gas pressure for increasing or decreasing respectively the counter-pressure for maintaining the said pressure difference substantially constant.

12. In a bottle filling apparatus, a liquid supply tank containing liquid under pressure of gas in the tank above the liquid surface, conduit means for conducting liquid from the tank to a bottle to be filled, a counter-pressure gas container containing gas under pressure different by a predetermined amount from the tank gas pressure, conduit means for conducting counter-pressure gas to the bottle interior to oppose the flow of liquid thereinto under the motivation of gas tank pressure and head of liquid in the tank, and means for maintaining the said pressure difference substantially constant comprising a supply source of gas under pressure, conduit means for conducting gas from the source to the counter-pressure container, and a single automatic means responsive to changes of tank gas pressure for controlling admission of gas to the container and discharge of gas therefrom.

13. In a bottle filling apparatus, a liquid supply tank containing liquid under pressure of gas in the tank above the liquid surface, conduit means for conducting liquid from the tank to a bottle to be filled, a counter-pressure gas container containing gas under pressure different by a predetermined amount from the tank gas pressure, conduit means for conducting counter-pressure gas to the bottle interior to oppose the flow of liquid thereinto under the motivation of gas tank pressure and head of liquid in the tank, and means for maintaining the said pressure difference substantially constant comprising a supply source of gas under pressure, conduit means for conducting gas from the source to the counter-pressure container, and a single automatic means responsive to changes of tank gas pressure for controlling admission of gas to the container and discharge of gas therefrom upon an increase or decrease respectively of tank gas pressure.

14. In a bottle filling apparatus, a liquid supply tank containing liquid under pressure of gas in the tank above the liquid surface, conduit means for conducting liquid from the tank to a bottle to be filled, a counter-pressure gas container containing gas under pressure different by a predetermined amount from the tank gas pressure, conduit means for conducting counter-pressure gas to the bottle interior to oppose the flow of liquid thereinto under the motivation of gas tank pressure and head of liquid in the tank, and means for maintaining the said pressure difference substantially constant comprising a supply source of gas under pressure, conduit means for conducting gas from the source to the counter-pressure container, and a single automatic means responsive to changes of counter-pressure for controlling admission of gas to the container and discharge of gas therefrom respectively upon a decrease or increase of counter-pressure.

15. In a bottle filling apparatus, a liquid supply tank containing liquid under pressure of gas in the tank above the liquid surface, conduit means for conducting liquid from the tank to a bottle to be filled, a counter-pressure gas container containing gas under pressure different by a predetermined amount from the tank gas pressure, conduit means for conducting counter-pressure gas to the bottle interior to oppose the flow of liquid thereinto under the motivation of gas tank pressure and head of liquid in the tank, and means for maintaining the said pressure difference substantially constant comprising a supply source of gas under pressure, conduit means for conducting gas from the source to the counter-pressure container, and a single automatic means responsive to changes of tank gas pressure and pressure in the container for controlling admission of gas to the container and discharge of gas therefrom respectively upon the occurrence of a decrease of the said predetermined pressure difference or an increase thereof.

16. In a bottle filling apparatus, a liquid supply tank containing liquid under pressure of gas in the tank above the liquid surface, conduit means for conducting liquid from the tank to a bottle to be filled, a counter-pressure gas container containing gas under pressure different by a predetermined amount from the tank gas pressure, conduit means for conducting counter-pressure gas to the bottle interior to oppose the flow of liquid thereinto under the motivation of gas tank pressure and head of liquid in the tank, and means for maintaining the said pressure difference substantially constant comprising a supply source of gas under pressure, conduit means for conducting gas from the source to the counter-pressure container, and a single automatic means responsive to changes of tank gas pressure for controlling admission of gas to the container and discharge of gas therefrom respectively upon a decrease or increase of the said predetermined pressure difference.

17. In a bottle filling apparatus, a liquid supply tank containing liquid under pressure of gas in the tank above the liquid surface, conduit means for conducting liquid from the tank to a bottle to be filled, a counter-pressure gas container containing gas under pressure different by a predetermined amount from the tank gas pressure, conduit means for conducting counter-pressure gas to the bottle interior to oppose the flow of liquid thereinto under the motivation of gas tank pressure and head of liquid in the tank, and means for maintaining the said pressure difference substantially constant comprising a supply source of gas under pressure, conduit means for conducting gas from the source to the counter-pressure container, and a single automatic valve means comprising a valve controlling flow of counter-pressure gas to the container and a valve controlling a vent from the container and a pressure-responsive movable element for operating the valves subjected to pressure of the tank gas above the liquid.

18. In a bottle filling apparatus, a liquid supply tank containing liquid under pressure of gas in the tank above the liquid surface, conduit means for conducting liquid from the tank to a bottle to be filled, a counter-pressure gas container containing gas under pressure different by a predetermined amount from the tank gas pressure, conduit means for conducting counter-pressure gas to the bottle interior to oppose the flow of liquid thereinto under the motivation of gas tank pressure and head of liquid in the tank, and means for maintaining the said pressure difference substantially constant comprising a supply source of gas under pressure, conduit means for conducting gas from the source to the counter-pressure container, and a single automatic valve means comprising a valve controlling flow of counter-pressure gas to the container and a valve controlling a vent from the container and a pressure-responsive movable element for operating the valves subjected to the pressure of counter-pressure gas in the container.

19. In a bottle filling apparatus, a liquid supply tank containing liquid under pressure of gas in the tank above the liquid surface, conduit means for conducting liquid from the tank to a bottle to be filled, a counter-pressure gas container containing gas under pressure different by a predetermined amount from the tank gas pressure, conduit means for conducting counter-pressure gas to the bottle interior to oppose the flow of liquid thereinto under the motivation of gas tank pressure and head of liquid in the tank, and means for maintaining the said pressure difference substantially constant comprising a supply source of gas under pressure, conduit means for conducting gas from the source to the counter-pressure container, and a single automatic valve means comprising a valve controlling flow of counter-pressure gas to the container and a valve controlling a vent from the container and a pressure-responsive movable element for operating the valves subjected to pressure of gas above the liquid and to the pressure of counter-pressure gas in the container.

20. In a bottle filling apparatus, a liquid supply tank containing liquid under pressure of gas in the tank above the liquid surface, conduit means for conducting liquid from the tank to a bottle to be filled, a counter-pressure gas container containing gas under pressure different by a predetermined amount from the tank gas pressure, conduit means for conducting counter-pressure gas to the bottle interior to oppose the flow of liquid thereinto under the motivation of gas tank pressure and head of liquid in the tank, and means for maintaining the said pressure difference substantially constant comprising a supply source of gas under pressure, conduit means for conducting gas from the source to the counter-pressure container, and a single automatic means for controlling admission of gas to the container and discharge of gas therefrom comprising a chamber having a movable dividing wall the opposite sides thereof being subjected to the tank gas pressure and counter-pressure respectively, and the wall being movable responsive to a predetermined difference of pressure occasioned by a variation of one or both said pressures, and valves controlling the admission of counter-pressure gas to the container and the venting of gas from the container correspondingly operable by movement of the movable wall.

21. In a bottle filling apparatus, a liquid supply tank containing liquid under pressure of gas in the tank above the liquid surface, conduit means for conducting liquid from the tank to a bottle to be filled, a counter-pressure gas container containing gas under pressure different by a predetermined amount from the tank gas pressure, conduit means for conducting counter-pressure gas to the bottle interior to oppose the flow of liquid thereinto under the motivation of gas tank pressure and head of liquid in the tank, and a single automatic means for maintaining the said predetermined difference of pressure substantially constant comprising a walled chamber, a movable wall dividing the chamber, a conduit communicating gas tank pressure to one side of the movable wall and a conduit communicating counter-pressure from the container to the other side, a spring tending to move the wall assisting the gas tank pressure, a valve for venting the chamber on the counter-pressure side of the wall operable by movement of the wall upon a preponderance of counter-pressure in the chamber, and a valve admitting counter-pressure thereto operable by movement of the wall upon a preponderance of gas tank pressure.

22. In a bottle filling apparatus, a liquid supply tank containing liquid under pressure of gas in the tank above the liquid surface, conduit means for conducting liquid from the tank to a bottle to be filled, a counter-pressure gas container containing gas under pressure different by a predetermined amount from the tank gas pressure, conduit means for conducting counter-pressure gas to the bottle interior to oppose the flow of liquid thereinto under the motivation of gas tank pressure and head of liquid in the tank, and a single automatic means responsive to increase or decrease of tank gas pressure for increasing or decreasing respectively the counter-pressure for maintaining the said pressure difference substantially constant.

FREDERICK W. MULLER.